D. F. COMSTOCK.
PHOTOMETER.
APPLICATION FILED JULY 31, 1916.
1,437,399.
Patented Dec. 5, 1922.
2 SHEETS—SHEET 1.
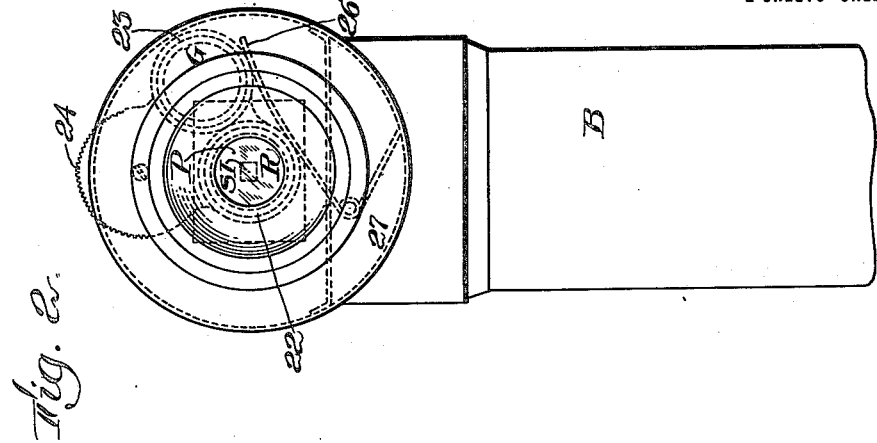
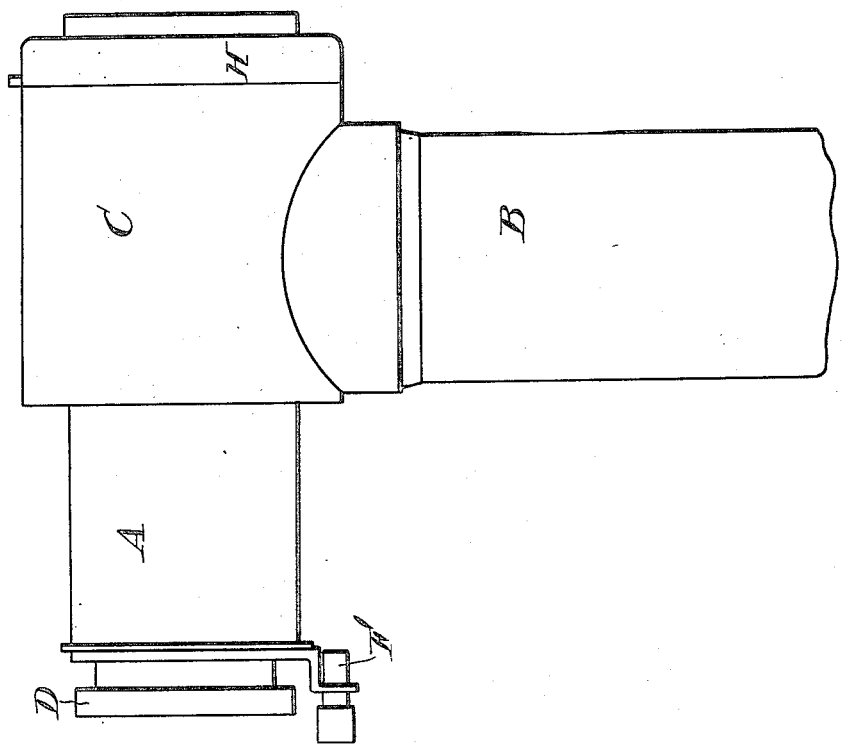
Inventor:
Daniel F. Comstock,
by Roberts, Roberts & Cushman
Attorneys.

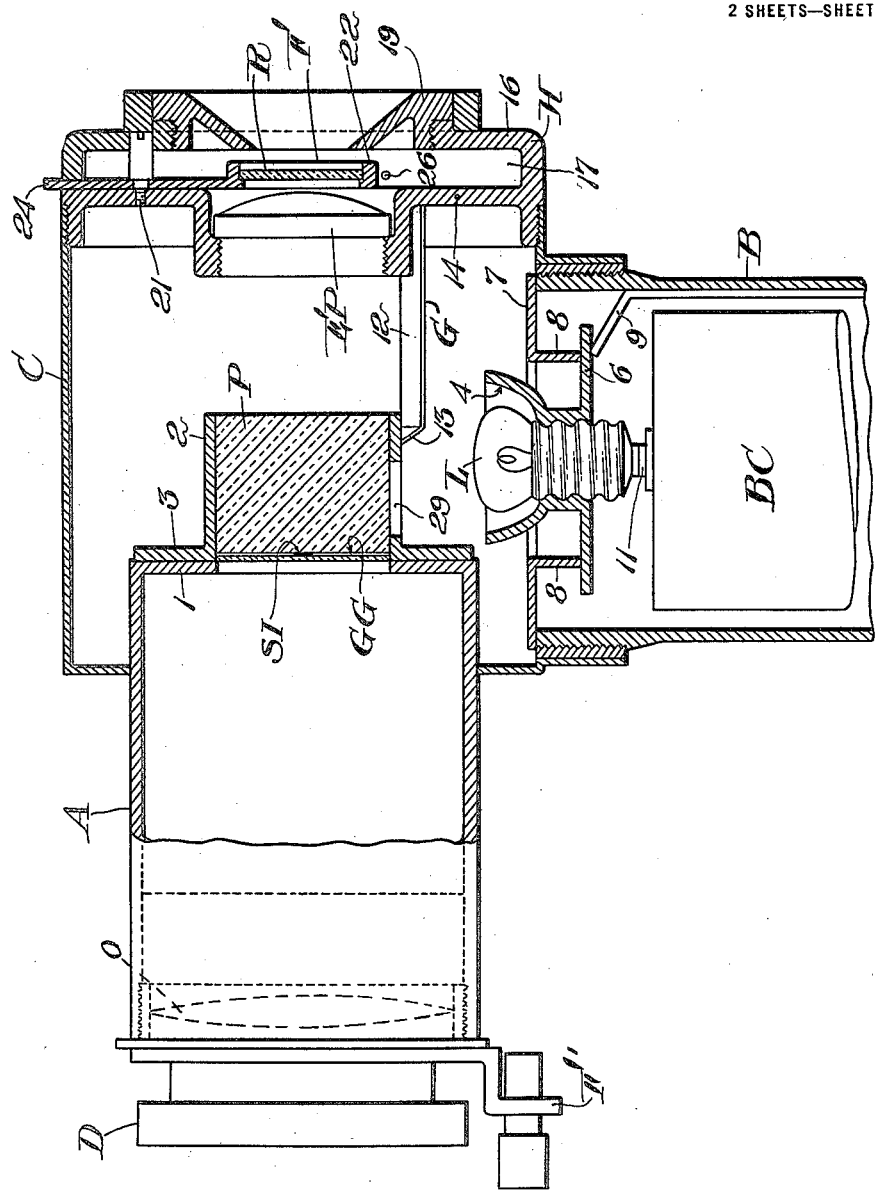

Patented Dec. 5, 1922.

1,437,399

UNITED STATES PATENT OFFICE.

DANIEL F. COMSTOCK, OF BROOKLINE, MASSACHUSETTS, ASSIGNOR TO KALMUS, COMSTOCK & WESCOTT, INCORPORATED, OF BOSTON, MASSACHUSETTS, A CORPORATION OF MASSACHUSETTS.

PHOTOMETER.

Application filed July 31, 1916. Serial No. 112,379.

*To all whom it may concern:*

Be it known that I, DANIEL F. COMSTOCK, a citizen of the United States, and resident of Brookline, in the county of Norfolk and State of Massachusetts, have invented new and useful Improvements in Photometers, of which the following is a specification.

This invention relates to the method of and means for determining the light values throughout an object field, and more particularly the invention relates to the method of and means for determining the respective values of a plurality of the constituent color components of light throughout an object field.

The invention provides for the determination of the intensity of the light from various portions of an image field, thus indicating the range of light values throughout the field, and preferably the invention also provides for the determination of the absolute intensity of the light from various portions of the field by the utilization of a source of standard illumination.

In the art of photography, it is desirable to estimate the light values of an object field before protographing the field in order to determine the proper period of negative exposure, and many devices have been designed to make such determinations with a fair degree of accuracy. However, these devices merely measure the average intensity of the light reflected from an object field and give no indication of the range of particular luminosities contained in the field.

In many instances, as for example in color photography, it is not only desirable to determine the average light value of the object field but it is also desirable to determine the range of light values throughout the field, that is, to determine the intensity of the light from the portions of maximum and minimum illumination and also from portions of intermediate illumination. One necessity for determining the range of light values is due to the fact that the photographic negative accurately records the relative light values of an object field only through a limited range of exposures, "exposure" being a term used to designate the product of exposure period by relative aperture of lens and by actinic intensity in object field. Thus it is important to choose the exposure period and the lens opening so that the exposure of every part of the object field, from brightest to darkest, shall fall within the correct exposure range of the negative used. To accomplish this choice it is of course insufficient, except in a general way where no particular accuracy is required, to know the average intensity of the entire field. For, even if the exposure period and diaphragm opening were chosen so as to bring the average illumination of the field within the range of proper exposure, particular portions of the field might easily happen to have light values either enough higher or enough lower than the average to fall outside the range of correct exposure, resulting in under-exposure or over-exposure giving incorrect representation. On the other hand, for certain special reasons, it may in particular cases be desirable to under-expose or over-expose certain portions of an object field, in which event, as well as in many other instances, it is essential accurately to estimate the particular light values throughout the field.

Colors occurring in an object field render comparison of light intensities very difficult and uncertain with ordinary measuring instruments employing an area of standard illumination for comparison with light from the object field, as herein described, since the line of division between the illumination from the scene and that from the area of standard illumination cannot be made entirely to disappear unless the colors of the two illuminations are practically identical. To overcome this difficulty I employ one or more light filters or color screens, through which both the standard illumination and the light from the object field are made to pass before reaching the eye, thus restricting each measurement to light which is essentially monochromatic, so that the disappearance point of the dividing line can be accurately determined. Furthermore, light components of different colors affect photographic films to widely different degrees, and for this reason it is desirable to measure the different color components in estimating the photographic power of any object field. And in color photography it is, of course, inherently desirable to measure separately each light component which is to be used separately to produce a picture.

The principal object of my invention is to provide a method of and means for quickly and accurately determining the light values throughout an object field by forming an image of the object field and comparing the various portions of the image with a surface of standard illumination. The apparatus preferably comprises either means for varying the average intensity of the image without changing the relative intensity of the various portions of the image, as for instance, diaphragm means, or means for varying the intensity of the source of standard illumination, whereby the area of standard illumination may be matched with successive portions of the image. The area of standard illumination may be varied in intensity, for example, by varying the distance between the lamp or other source of light and the illumination medium, which may be either a reflecting or a transmitting medium, or by varying the power supplied to the lamp, or by cutting off more or less of its light by a diaphragm or a light filter.

A further object of my invention is to provide a method of and means for determining the intensity of one or more of the color components of light from an object field. This I preferably accomplish by projecting light either from the object field or from an image of the object field through one or more filters and by comparing the light of a particular color with standard light of the same or a suitable color. Suitable apparatus for this purpose comprises means for projecting light from an image of the object field and from a source of standard illumination through a screen or filter and means for varying the intensity of the image or of the light source whereby the corresponding components of light from the image and from the standard source, respectively, may be matched. Other suitable apparatus comprises means for producing standard colored light, viz, a lamp having a colored bulb or a standard comparison medium adapted to transmit or reflect only colored light, wherein the light from the standard source need not be filtered.

In matching light of a particular color from the object field with light of the same or similar color from the source of standard illumination, it is most convenient to use a source of approximately white light for the standard illumination and to obtain light of a particular color therefrom by employing a filter in the path of the white light which will transmit only the component of light of the desired color. The light values of the color components emanated by the ordinary incandescent lamp bear a certain relation to each other at a given temperature, but these values do not bear a uniform relation to the corresponding actinic values of the color components. Consequently, when different colors of the object field are matched with the respective corresponding colors from the standard source, through respective color screens, a different table of comparison must be used for each color with the preferred form of my invention.

For example, red light has a lower actinic value than blue light but the quantities of red and blue light respectively radiated from the standard source of illumination do not bear the same relation to each other as do the corresponding actinic values. When comparing a red portion of the image with the red component of the standard source by diaphragming the lens aperture and thereby varying the average intensity of the image until the red components from the image and from the standard source match the diaphragm scale gives a certain indication. If the diaphragm scale is calibrated in terms of effective aperture opening a table or other means is resorted to in order to determine the actinic value of the red light from the image which matches in intensity with the red light from the standard source at the indicated aperture opening. Blue light from the object scene, even if of the same light value as the red light would only by accident give the same aperture indication when matched against the blue component of the standard source inasmuch as the red and blue components of the ordinary standard source differ widely in quantity. Consequently the standard source for use in color measurements should be calibrated for each color component which it is desired to measure and the calibration should be made with the light screens to be used in the apparatus. Tables are then prepared from the calibrations showing the actinic values of any desired color component corresponding to the aperture reading obtained by matching the particular colors as described. It obviously follows that the aperture or diaphragm scale may be calibrated in terms of actinic values by providing separate parallel scales for the respective colors.

I also contemplate the use of a single scale calibrated in terms of actinic values in lieu of a table or of a plurality of separate scales for measuring the various color components of a plurality of separate scales. This may be accomplished in a number of ways among which may be mentioned the use of a number of small lamps having colored bulbs, the bulbs being so constructed that they transmit their respective components of light in inverse proportion to the actinic values of the components.

A further object of my invention is to provide an image-receiving means in close proximity to the area of standard illumination, the latter preferably comprising a small piece of white or suitably colored matt paper, and to provide means for projecting light from an incandescent lamp or other light source upon the area of standard illumination without projecting an appreciable amount of light upon the image-receiving means. Suitable means for attaining this end comprises a ground glass surface, a standard area of illumination, a totally reflecting surface in close proximity to the ground glass surface and adjoining the standard illumination area, and a source of light positioned to project light to the region of the ground glass surface and standard illumination surface at such an angle that the light which would otherwise strike the ground glass is reflected by the totally reflecting surface.

Figure 1 is a side elevation of the photometer, showing the lower portion broken away;

Figure 2 is a rear end elevation of the device; and

Figure 3 is a vertical, longitudinal cross-sectional view showing the forward end of the device in elevation.

The particular embodiment of the invention illustrated in the drawings comprises a cylindrical casing C having a forward tubular extension A and a lower tubular extension B. The image-forming means preferably comprises a lens O mounted in the focusing device F' in the forward end of the tubular extension A, and a ground glass GG mounted in the rearward portion of the tubular member A, this member extending within the casing C and having an internal flange 1. The focusing device F' may comprise any ordinary means for adjusting the lens carried thereby lengthwise of the tube A. In front of the focusing device F' is mounted diaphragm mechanism D which may likewise comprise any ordinary means for varying the diameter of the lens aperture.

To the rear end of the tubular member A is mounted a prism holder 2 having a flange 3 which may be soldered or otherwise secured to the flange 1. The prism holder is preferably of rectangular cross sectional shape whereby the rectangular prism P and the ground glass member GG may be mounted therein, the rectangular opening registering with a rectangular opening in the end of the tubular member A. On the forward face of the prism P is mounted a member having a comparatively rough surface, for example, a piece of paper SI having a mat surface, whereby it may be illuminated by light striking it at a comparatively acute angle. The ground glass surface is preferably on the rear face of the ground glass member GG so that the image will be formed in a plane in close proximity to the area of standard illumination SI, and, if desired, a thin plate of glass having a ground surface on its forward side may be mounted between the standard illumination area and the ground glass GG with its ground surface in contact with the ground surface of GG, thereby forming a double ground glass surface which will afford a very satisfactory image-receiving means. The illumination area is preferably secured to the prism P by means of a glue which has a high index of refraction, in order that the glass surface in front of it may not be totally reflecting.

Within the tubular extension B which is threaded into a circular extension on the lower side of the casing C, is mounted an incandescent lamp L and a battery cell BC. The lamp is preferably threaded into a combined socket and reflector comprising a reflecting surface 4 and a lower flange 6 secured to the upper flange 7 by means of vertical members 8, the upper flange being soldered or otherwise secured to the upper end of the lower extension B. Electrical connection is made from the battery cell BC to the lamp L by means of a conducting spring member 9 contacting with the lower flange 6 of the lamp support and by means of a central electrode 11 on the holder which contacts with the central terminal of the lamp. A light guard G comprising a thin horizontal plate of brass or other suitable material is preferably secured to the opposite sides of the casing C by means of upturned flanges 12 and to the lower side of the prism holder 2 by means of a forward upturned flange 13 whereby light may be prevented from passing from the lamp to the eyepiece now to be described.

The eyepiece EP is preferably threaded into the eyepiece holder H which, in turn, is threaded into the rear end of the cylindrical casing C. The eyepiece holder H has two transverse walls 14 and 16 spaced apart to form a compartment 17 therebetween and within the center portion of the rear wall 16 is threaded an ordinary hard rubber member 19, in alinement with the eyepiece EP, the illumination area SI and the image-receiving means GG.

Within the compartment 17 formed by the double wall of the eyepiece holder H, is a light filter holder F pivotally mounted to the wall 14 by means of a screw 21. This member is preferably formed of brass and in the particular embodiment of the invention illustrated in the drawings comprises two flanged apertures 22 and 23 for supporting two light filters, for example a plate of red glass R in aperture 22 and a plate of green glass G in aperture 23, although it is obvious that any desired number of apertures might be provided in the filter holder to receive a corresponding number of different light filters. The upper portion of the filter holder extends upwardly through a slot in the outer portion of the eyepiece holder and has a milled edge 24 for rotating the filter holder to bring any desired color screen in alinement with the optical axis of the system. A coil spring 26 may be pivotally mounted at 27 to engage the lower edge of the filter holder and hold the filters in adjusted position.

The operation of the device is as follows: The circuit of the lamp L is closed by means of a switch (not shown) on the extension B whereby the lamp L is caused to radiate light through the aperture 29 in the lower side of the prism holder 2 and thence through the prism P to the standard illumination area SI. Owing to the fact that the light strikes the glass-air surface at the forward side of the prism P at a relatively acute angle, the light incident to this surface is reflected backwardly and thus is prevented from striking the ground glass surface GG. Owing to the fact that the illumination area SI is secured to the prism P by means of a glue having a high index of refraction, approximately equal to the index of refraction of the glass prism, the light directed toward the illumination area is not reflected by the rear surface of the prism but passes through the glue as it would through a continuous glass path; and owing to the fact that the illumination area has a relatively rough surface, the light incident thereto is not reflected upwardly therefrom but produces an illumination on the surface which is readily visible from the eye-piece EP. The device is then directed toward the object field, the light values of which it is desired to determine, and a true image of the field is produced on the ground glass surface GG by adjusting the focusing device F' until the image is sharply focused on the ground glass GG. The area of standard illumination and the image, which are in substantially the same plane, may then be viewed from the eyepiece, through the prism P, and any portion of the image may be brought into proximity to the illumination area by slightly shifting the direction of the device so that the image is caused to move with relation to the illumination area. The light value or intensity of any portion of the field may be matched against the illumination area by varying the average intensity of the image by means of the diaphragm mechanism D. When a certain portion of the image field is of the same intensity as the standard illumination the corresponding size of the lens aperture is noted as indicated by the scale on the diaphragm mechanism. This constitutes a measure of the light value of the particular portion of the object field under investigation and the light value of other portions of the field may be determined in like manner. As indicated above, the diaphragm scale may be calibrated directly in terms of light value or a table may be employed to convert the values of diaphragm aperture opening into the corresponding light values.

The above description applies to the operation of the device when used to determine the relative intensity of different sources of white light and also to compare different sources of colored light, but as mentioned above an accurate determination of the light value of a source of colored light requires a standard light of the same color for comparison therewith. Consequently, when a colored portion of the object field is to be measured, one of the color filters R or G is brought into alinement with the optical system, whereby only the light of the particular color is permitted to pass from the image and from the area of standard illumination to the eye of the operator. By successively using various filters provided, any desired number of color values may be determined. Ordinarily, a table for each particular color is provided to give the actinic values corresponding to the aperture openings. Thus, the range of light values of an object field may be determined not only with respect to white light but also with respect to components of light of various colors.

I claim:

1. The method of determining the light values throughout an object field comprising forming an image of the object field, and producing an area of standard illumination in the region of said image, whereby the area of standard illumination may be compared with any portion of the image for determining the light value of the corresponding portion of the object field.

2. The method of determining the light value of a portion of an object field comprising forming an area of image illumination consisting of an image of the object field, producing an area of standard illumination in the region of the area of image illumination, and varying the intensity of one of the areas of illumination until the intensity of the standard illumination bears a certain relation to the intensity of the portion of the image illumination corresponding to the portion of the object field, the light value of which is to be determined.

3. The method of determining the light value of an object field comprising illuminating an area with light from the object field, illuminating an area with light from a standard source, and passing light of one and substantially the same dominant hue directly from the two areas to a comparison region.

4. The method of determining the light value of an object field comprising illuminating an area with light from the object field, illuminating an area in the region of the first area with light from a standard source, and passing light of one and substantially the same dominant hue in the same direction from the two areas to a comparison region.

5. The method of determining the light value of an object field comprising illuminating an area with light from the object field, illuminating an area with light from a standard source, and passing light from the two areas through a light filter, whereby a color component of light from the object field may be compared with the corresponding color component from the area of standard illumination.

6. The method of determining the light values throughout an object field comprising forming an image of the object field and producing an area of standard illumination in the region of the image in such manner that said image and area may be shifted laterally with respect to each other and shifting the image and area with respect to each other to bring said area into juxtaposition to the portion of the image corresponding to the portion of the object field the light value of which it is desired to determine.

7. The method of determining the light values throughout an object field comprising forming an image of the object field, producing a relatively small area of standard illumination substantially in the plane of the image, and shifting said image and area along said plane with respect to each other so as to bring said area into juxtaposition to different portions of the image.

8. The method of determining the light values throughout an object field comprising forming an image of the object field, producing an area of standard illumination in the region of said image, and projecting light from the image and from the area of standard illumination through a light filter, whereby the various color components of the light from the object field may be compared with corresponding color components of light from the area of standard illumination.

9. Apparatus for measuring light values of an object field comprising means for producing an area of standard illumination, means for forming an image of the object field in the region of the area of standard illumination, whereby portions of the image corresponding to portions of the object field may be compared with the area of standard illumination.

10. Apparatus for measuring light values of an object field comprising image receiving means, means for producing an area of standard illumination in the region of the image receiving means, and means for forming an image of the object field on the image receiving means, whereby portions of the image corresponding to portions of the object field may be compared with the area of standard illumination.

11. Apparatus for measuring light values of an object field comprising means for producing an area of standard illumination, means for producing in the region of the area of standard illumination an area of image illumination consisting of an image of the object field, and means for varying the intensity of one of the areas of illumination, whereby portions of the object field may be compared with the area of standard illumination.

12. Apparatus for measuring light values of an object field comprising image receiving means, means for producing an area of standard illumination in the region of the image receiving means, means for forming an image of the object field on the image receiving means, and means for varying the intensity of the image, whereby portions of the image corresponding to portions of the object field may be compared with the area of standard illumination.

13. Apparatus for measuring light values of an object field comprising image receiving means, means for forming an image of the object field thereon, a reflecting surface in the region of the image receiving means, and a source of standard illumination arranged to project light to the reflecting surface along a path making an acute angle with the image receiving means.

14. Apparatus for measuring light values of an object field comprising image receiving means, means for forming an image of the object field thereon, a reflecting surface in the region of the image receiving means, a source of standard illumination for illuminating the reflecting surface, a housing for the image receiving means having a view aperture therein, and means for substantially preventing reflection from the image receiving means to the aperture of light emanating from the source.

15. Apparatus for measuring light values of an object field comprising an elongate housing containing an image receiving means, a reflecting surface in the region of the image receiving means, means within one end of the housing for forming an image on the image receiving means, the housing having a view aperture in the other end thereof, a standard lamp for illuminating the reflecting surface, and a lateral extension on the housing adapted to contain a source of energy for the lamp and to serve as a support for the housing.

16. Apparatus for measuring light values of an object field comprising a ground glass surface and means for forming an image of the object field thereon a standard illumination area and a totally reflecting surface in proximity to the ground glass surface, and a light source for projecting light to the illumination area along a path making an acute angle with the totally reflecting surface, whereby light may be projected from the light source to the illumination area without being projected in appreciable measure to the ground glass surface.

17. Apparatus for measuring light values of an object field comprising image-receiving means and means for forming an image of the object field thereon, a standard illumination area in proximity to the image-receiving means, a prism having a totally reflecting surface in proximity to the image-receiving means, and means for projecting light through the prism to the illumination area at an acute angle to the totally reflecting surface, whereby light may be projected to the illumination area without being projected in appreciable measure to the image-receiving means.

18. Apparatus for measuring light values of an object field comprising means for forming an image of the object field, and means for producing an area of standard illumination in the region of the image, said means being arranged so that said image and area may be shifted laterally with respect to each other to bring said area into juxtaposition to different portions of the image.

19. Apparatus for measuring light values of an object field comprising means for forming an image of the object field, means for producing a relatively small area of standard illumination substantially in the plane of said image, and means for shifting said image and area relatively to each other along said plane to bring said area into juxtaposition to different portions of the image.

Signed by me at Boston, Massachusetts, this 27th day of July, 1916.

DANIEL F. COMSTOCK.